Patented Apr. 27, 1954

2,676,979

UNITED STATES PATENT OFFICE 2,676,979

SODIUM-META-SULFOBENZOIC ACID ESTERS

Milton Kosmin, Dayton, Ohio, assignor to Monsanto Chemical Company, St. Louis, Mo., a corporation of Delaware No Drawing. Application August 6, 1952,
Serial No. 302,997

1 Claim. (Cl. 260—470)

The present invention relates to surface-active agents and is particularly concerned with tridecyl esters of alkali-metal sulfobenzoic acid as new compounds possessing a high degree of utility as wetting-out and lathering agents.

As is known, surface-active agents find wide application in a large number of industrial processes, especially in those relating to the treatment of textiles, leather, and other fibrous materials. Among the compounds heretofore suggested for these and related purposes are the esters of sulfobenzoic acid and aliphatic alcohols containing from 8–12 or 18 carbon atoms, for example the octyl, dodecyl, or oleyl sodium sulfobenzoate as illustrated in U. S. Patents 2,359,291 and 2,423,972. I have now found, as a result of comparative tests, that the heretofore unknown esters of the alkali metal sulfobenzoic acids with a certain mixture of isomeric tridecyl alcohols are of outstanding value, not only for the purpose of assisting in the wetting of textile materials, but also from a lathering standpoint. They are particularly valuable as tasteless surface-active agents in dentrifice formulations.

The present sulfobenzoates are obtained from alkali-metal salts of o, m or p-sulfobenzoic acid or acid halides thereof and an alcohol fraction derived by the carbonylation and hydrogenation (Oxo) reaction of the olefins triisobutylene and tetrapropylene. The alcohol fraction which forms the starting material for my present esters may be defined as having the structure ROH, wherein R is a primary alkyl radical having an average of 13 carbon atoms derived from an alcohol formed by the carbonylation and hydrogenation of triisobutylene or tetrapropylene or mixtures thereof.

The present sulfobenzoates may be represented by the following structure

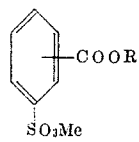

in which R is as defined above and Me is alkali metal, e. g., sodium, potassium or lithium.

The invention is further illustrated but not limited by the following example.

EXAMPLE

Into a reaction vessel equipped with mechanical stirrer, thermometer and drying tube there was placed 414 g. of an isomeric mixture of tridecyl alcohols boiling within the range of 252.8° C.–273.9° C. and obtained by the Oxo process from a polymeric olefin of 12 carbon atoms, carbon monoxide and hydrgen. Sulfobenzoic acid (404 g.) was melted in an open beaker and the melted acid was added, at a temperature of 150° C., to the tridecyl alcohol during a time of about 2 minutes. The mixture was then heated and stirred at 95–100° C. for a time of 40 minutes and allowed to stand overnight. A portion of the reaction mixture removed after the 40 minute interval had a neutralization equivalent of 316.1. The neutralization equivalent of the reaction mixture after it had stood overnight we found to be 311.3. At this point the reaction mixture comprised the substantially pure tridecyl sulfobenzoic acid.

The entire reaction mixture was then slurried with a total of 2500 ml. of water and slowly neutralized to a pH of about 8 by means of 40% aqueous sodium hydroxide. Drum-drying of the resulting slurry, employing a slow rate of feed from a dropping funnel and operating the vacuum drum dryer at a 65 p. s. i. gage steam pressure, gave 676.8 g. (82% theoretical yield) of crude tridecyl sodium sulfobenzoate.

A 320 g. portion of the crude product was purified by stirring it for 20 minutes with 480 g. of acetone, filtering and drying the filtrate overnight in a vacuum oven at a temperature of 40° C. The acetone-purified tridecyl sodium sulfobenzoate was tested as a wetting-out agent employing the Draves test of the American Association of Textile Colorists. The wetting speed thus obtained for this ester as well as similarly obtained wetting speeds for closely related compounds are given in the following table

*Wetting speed—Draves method*

[Seconds at percent concentration.]

| Alkyl Sodium Sulfobenzoate | 0.5 | 0.25 | 0.125 | 0.0625 | 0.031 | .016 |
|---|---|---|---|---|---|---|
| m-tridecyl | 4.2 | 6.1 | 7.9 | 10.6 | 18.0 | 51 |
| m-dodecyl | 11.4 | 19.1 | 24.0 | 45.8 | 121.0 | 180+ |
| o-tetradecyl |  | 15.8 | 21.1 | 48.0 | 90.0 | 180+ |
| o-dodecyl | 4.1 | 5.6 | 9.6 | 20.1 | 41.6 | 180+ |

Evaluation of the foaming properties of the acetone-purified tridecyl sodium sulfobenzoate by the Ross-Miles lathering test (a proposed method of the American Society for Testing Materials) gave the following values as compared with a like test of the ester of m-sulfobenzoic acid and Lorol (a mixture of $C_{12}$—$C_{13}$ alcohols obtained by hydrogenation of coconut oil fatty acids):

*Ross-Miles lather test*

| Compound Tested | Water Hardness, 50 p. p. m. | | Water Hardness, 300 p. p. m. | |
|---|---|---|---|---|
| | At Once | After 5 Min. | At Once | After 5 Min. |
| Lorol Na m-sulfobenzoate | 15.4 | 15.3 | 10.8 | 10.6 |
| Tridecyl Na m-sulfobenzoate | 19.5 | 19.4 | 15.1 | 15.0 |

What I claim is:
A product having the formula

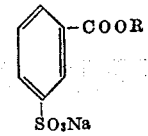

in which R is a primary alkyl radical having an average of 13 carbon atoms derived from an alcohol formed by the carbonylation and hydrogenation of an olefin selected from the class consisting of triisobutylene and tetrapropylene.

No references cited.